(12) United States Patent
Cook

(10) Patent No.: US 10,694,164 B2
(45) Date of Patent: *Jun. 23, 2020

(54) GENERATED STEREOSCOPIC VIDEO USING ZENITH AND NADIR VIEW PERSPECTIVES

(71) Applicant: Nvidia Corporation, Santa Clara, CA (US)

(72) Inventor: David Cook, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,422

(22) Filed: Jul. 31, 2019

(65) Prior Publication Data

US 2020/0021790 A1   Jan. 16, 2020

Related U.S. Application Data

(63) Continuation of application No. 16/036,389, filed on Jul. 16, 2018, now Pat. No. 10,412,361.

(51) Int. Cl.
| | |
|---|---|
| *H04N 13/00* | (2018.01) |
| *H04N 13/117* | (2018.01) |
| *H04N 13/361* | (2018.01) |
| *H04N 13/344* | (2018.01) |
| *H04N 13/156* | (2018.01) |

(52) U.S. Cl.
CPC ......... *H04N 13/117* (2018.05); *H04N 13/156* (2018.05); *H04N 13/344* (2018.05); *H04N 13/361* (2018.05); *H04N 2013/0088* (2013.01)

(58) Field of Classification Search
CPC .. H04N 13/361; H04N 13/156; H04N 13/106; H04N 13/243; H04N 13/117; H04N 13/344; H04N 13/194; H04N 13/128; H04N 2013/0088
USPC ......... 348/144, 42, 46, 47, 48, 51, 143, 159; 386/223, 224
See application file for complete search history.

(56) References Cited

U.S. PATENT DOCUMENTS

| | | | |
|---|---|---|---|
| 6,914,599 B1 | 7/2005 | Rowe et al. | |
| 7,907,167 B2 | 3/2011 | Vesely et al. | |
| 8,768,043 B2 | 7/2014 | Sakaguchi et al. | |
| 9,167,231 B2 | 10/2015 | Kawakami et al. | |
| 9,225,969 B2 | 12/2015 | Aguirre-Valencia | |
| 9,465,224 B2 | 10/2016 | Tanioka | |
| 10,412,361 B1 * | 9/2019 | Cook | H04N 13/361 |
| 2017/0118458 A1 | 4/2017 | Gronholm et al. | |

(Continued)

FOREIGN PATENT DOCUMENTS

| | | |
|---|---|---|
| CN | 102289145 A | 12/2011 |
| JP | 2013150103 A | 8/2013 |

OTHER PUBLICATIONS

US 9,220,975 B2, 12/2015, Takeuchi et al. (withdrawn)

(Continued)

*Primary Examiner* — Robert Chevalier

(57) ABSTRACT

The disclosure is directed to a method to generate a stereoscopic video image stream of a zenith or nadir view perspective of a scene. In another aspect, a system is disclosed for generating a zenith or nadir view perspective utilizing a relative user view orientation. In yet another aspect, a video processing computer is disclosed operable to generate a zenith or nadir view perspective utilizing a user view orientation.

20 Claims, 6 Drawing Sheets

(56) References Cited

U.S. PATENT DOCUMENTS

2018/0184063 A1* 6/2018 Burgess ............... G11B 27/031
2019/0208181 A1* 7/2019 Rowell ............... H04N 13/122

OTHER PUBLICATIONS

"Final Cut Pro & 360 spherical video—All you need to know"; 17 pgs.
"The Cinematic VR Filed Guide—A Guide to Best Practices for Shooting 360"; JAUNT Studios; jauntvr.com; Version 1.5; Jan. 2017; pp. 1-68.
"VR overview"; Unity User Manual; Version: 2017.3; unity3d.com; https://docs.unity3d.com/Manua/VROverview.html; 2018; pp. 1-6.

* cited by examiner

GENERATED STEREOSCOPIC VIDEO USING ZENITH AND NADIR VIEW PERSPECTIVES

CROSS-REFERENCE TO RELATED APPLICATION

This application is a continuation of U.S. patent application Ser. No. 16/036,389, entitled "GENERATED STEREOSCOPIC VIDEO USING ZENITH AND NADIR VIEW PERSPECTIVES", filed on Jul. 16, 2018. The above-listed application is commonly assigned with the present application and is incorporated herein by reference in its entirety.

TECHNICAL FIELD

This application is directed, in general to a virtual reality display process, and, more specifically, to creating a generated stereoscopic video image stream in the zenith and nadir user view directions

BACKGROUND

In an environment in which a user is displaying, via a virtual reality display, a video image stream captured from a stereoscopic camera rig, i.e., a rig with at least two cameras whose images can be combined to create a stereoscopic view perspective, it can be difficult to show user view perspectives in the up (zenith) direction or down (nadir) direction (relative to the orientation of the camera rig), while maintaining the stereoscopic effect (minimizing distortion) and while the user is rotating their view perspective through their view arc, such as 360° (degrees) rotation. This is similar to the problem encountered when a user tilts their head while looking at stereoscopic content. Except in the case of looking up or down (in a statically created video stream), a user can experience an appropriate stereoscopic view perspective in one direction of the view arc. The other directions may appear distorted, due to the static nature of video image streaming. Current solutions may revert to a monoscopic view for zenith and nadir view directions and therefore do not present a stereoscopic view perspective in those user view directions.

SUMMARY

In one aspect, the disclosure provides a method of generating a stereoscopic video image stream of scene images captured by multiple cameras. In one embodiment, the method includes: (1) selecting video image streams from the scene images that proximately represent a user view orientation that is relative to the multiple cameras, wherein at least one of the video image streams is a zenith or nadir user view perspective of the scene images, and (2) generating a stereoscopic video image stream for the zenith or nadir user view perspective utilizing the video image streams and a blending of a monoscopic view perspective and a stereoscopic view perspective, wherein the blending is proportionate to the user view orientation and orientations of the video image streams.

In another aspect, the disclosure provides a video processing system operable to generate user view perspectives of scene images captured by multiple cameras. In one embodiment, the system includes: (1) a stitcher, operable to combine multiple video image streams of the scene images to generate a stereoscopic video image stream, and (2) a processor, operable to adjust at least one of the multiple video image streams by utilizing a relative user view orientation and by blending monoscopic and stereoscopic user view perspectives, wherein at least one of the video image streams is a zenith or nadir view direction of the scene images.

In yet another aspect, the disclosure provides a video processing computer that generates user view perspectives of scene images captured by a multi-camera apparatus. In one embodiment, the computer includes: (1) a processor operable to generate adjusted video image streams based on a user view orientation and video image streams, wherein at least one of the video image streams is a zenith or nadir view perspective of the scene images, and (2) a stitcher operable to generate a stereoscopic video image stream utilizing the adjusted video image streams.

BRIEF DESCRIPTION

Reference is now made to the following descriptions taken in conjunction with the accompanying drawings, in which.

DETAILED DESCRIPTION

Figure 1:
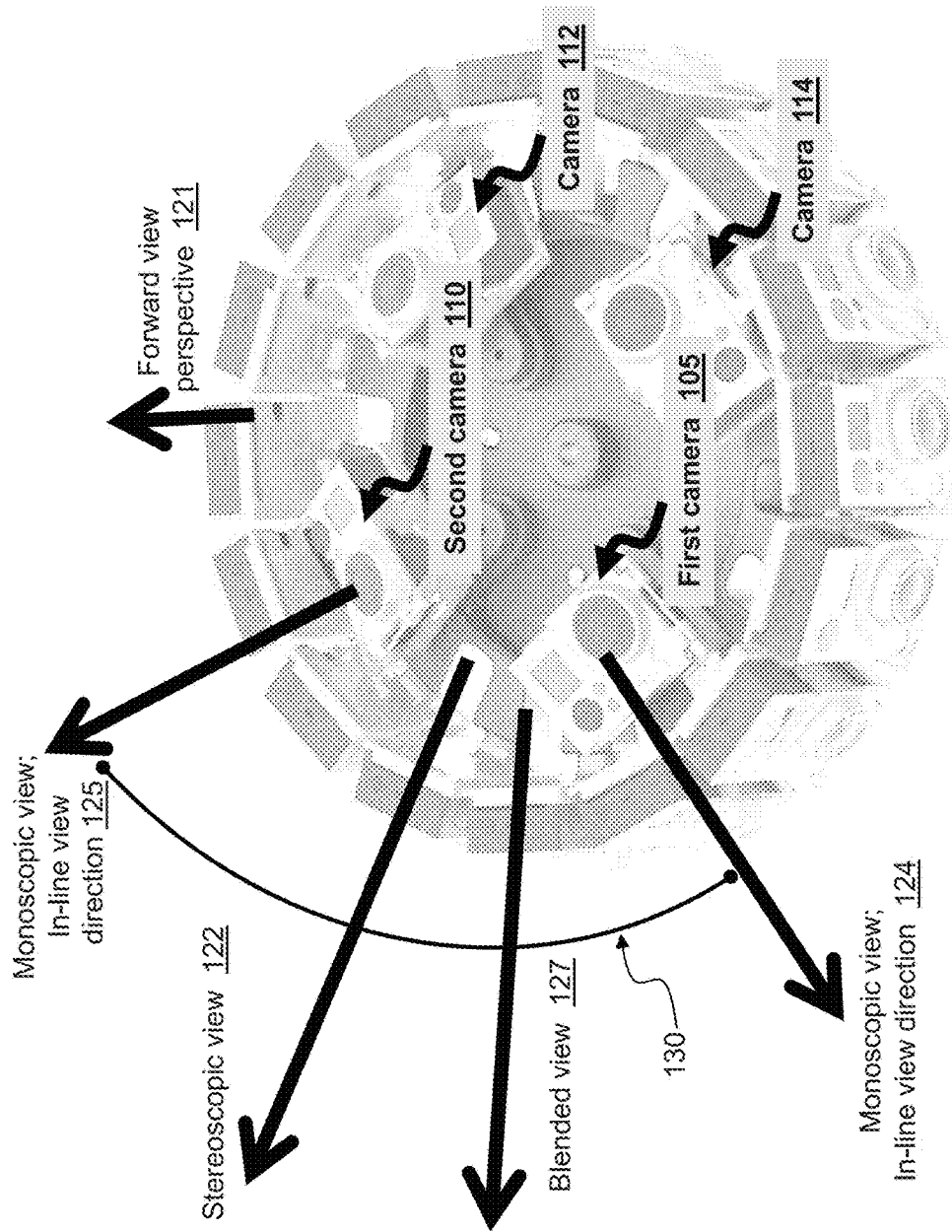
FIG. 1 is an illustration of an image of an example camera apparatus that are used to capture zenith and nadir user view perspectives with more than one camera.

Various events or locations, such as sporting events, music concerts, the Grand Canyon, and the ocean, can be captured by VR/360 camera rigs for virtual reality (VR) viewing that is transmitted live, delayed, or recorded for playback at a future time. For the VR experience, a user can view the captured video on a VR display device, such as a VR headset. A user utilizing a VR display device can experience a more immersive visual experience since the VR display device can provide a three dimensional (3D) view of the event. The user can tilt their eyes, relative to the camera rig's orientation, to view the video scene in the up (zenith) and down (nadir) directions.

There can be issues with the rendering of the 3D view of the scene. When the angle of viewing is not lined up with how the cameras captured the original event, then a video processor would need to process one or more of the camera video images, i.e., video image streams or video streams, and blend, i.e., stitch, them to create the 3D view for the user. An issue can occur due to the way the cameras used to capture the scene are configured. Some configuration factors can be that there are few cameras in the camera rig oriented in the zenith and nadir directions, fields of view captured by each camera can overlap the fields of view of other cameras in the camera rig by varying amounts, the field of view of each camera can vary as to the angle captured, the angle of coverage, or spacing, of each camera in the camera rig can vary, and other configuration factors can be present. The blending process can introduce a visual artifact, i.e., distortion, which can be noticeable by the user viewing the 3D view. Another issue can occur where the differing depths of objects can cause distortions and artifacts of the 3D view. For example, a distant object can appear closer than it should because of the way the various camera video image streams are blended to form the VR 3D image.

This disclosure addresses visual distortions that can be introduced when processing the video image streams, where at least one of the video image streams is from a zenith or nadir orientated camera, by analyzing how the user is viewing the VR 3D view, i.e., the angle of the user's eyes compared to the angle of how the video image streams were originally captured, analyzing the video image streams that are to be blended, and adjusting one or more of the video image streams to counteract the distortion to bring the VR 3D view closer to a non-distorted view for the user. Here, closer is intended to be a point where the distortion is no longer, or minimally, perceivable by an average user. An adjustment can be to blend two camera video image streams to create a stereoscopic 3D view and then to gradually decrease the stereoscopic 3D view towards a monoscopic view as needed. Another adjustment that can be implemented is by stretching and/or compressing one or more of the video image streams, so that the relative, i.e., user perceived, distance between two video image streams remains close in value as the user turns their eyes to look at different parts of the overall VR 3D view.

The described method and system can be implemented at various points in the video input/output stream. For example, part or all of the system can be implemented at the point the video input is being captured by the camera rig, where the video input is being stored (such as in a server or data center location), and in a cloud environment. Alternatively, the system can be implemented local to the user, for example, a local storage area, a local video processing system, and in a VR display device used by the user. A combination of these locations can be utilized via communicative coupling, such as storing the video in a cloud storage location, having the video image streams adjusted by a video processor local to the user, and being displayed on a user VR display. Other combinations are also possible.

In a VR/360 environment, the user view arc can be a full circle of 360° or some portion thereof, across some or all latitudes of view. As the latitude of view approaches the up, i.e., zenith, direction or the down, i.e., nadir, direction, there can be difficulty maintaining the stereoscopic view. For example, there may be a limited number of camera views available. This disclosure, as an example, refers to a camera rig as capturing a 360° arc of a scene (see FIG. 1). The camera rig can have a smaller arc of scene coverage, for example, 270° of a user view perspective arc. Typically, the video image streams are captured, i.e., recorded, by the camera rig at substantially the same time from the cameras included with the camera rig. Due to minor variations in circuitry and processing, simultaneous capture may not occur.

The difficulty in maintaining the stereoscopic user view perspective when viewing zenith or nadir perspectives is similar to the difficulty experienced when a user tilts their head when looking at a stereoscopic video image stream. In a statically created video image stream, a user can typically see an appropriate stereoscopic view perspective in one direction of the user view perspective arc. Because of this difficulty, current industry solutions revert to a monoscopic view for zenith and nadir user view directions (where such user view directions are relative to the camera rig orientation) and therefore, do not attempt to generate a stereoscopic video image stream in those directions.

The video image stream captured by the camera rig can be of various types of scenes, for example, a sporting event, a NASA launch, a musical, a medical procedure, nature, wildlife, and other types of scenes. The scenes are typically live captured scenes as opposed to rendered scenes. Rendered scenes can utilize video processing algorithms to achieve true stereoscopic views for a selected user view direction. Rendered scene processing is not available for live captured scenes.

Typically, camera rigs include a limited number of zenith and nadir facing cameras. In FIG. 1, the example diagram shows sixteen cameras arranged radially, and four cameras arranged facing in the zenith direction. The cameras may have some overlapping area, i.e., margin, of scene field capture in order to generate the left eye/right eye stereoscopic view perspective. The limited number of available video image streams, from the limited number of zenith and nadir facing cameras, results in limited capability to generate stereoscopic video image streams in the possible user view orientations. For example, a user view orientation, relative to the video image streams as captured by the camera rig, can be in various orientations, for example, up, down, left, right, rotate, tilt, shift, depth, straight ahead, up and to the left, up-behind-slightly to the right, and other combinations and view perspectives.

For example, a user can be viewing a video image stream in a zenith relative direction, and can be viewing it as a stereoscopic view perspective. If the user rotates their view perspective along the user view arc, the user view perspective can reach a point where there is not an adequate pair of video image streams, i.e., captured video, to properly generate a stereoscopic view perspective. For example, the overlap field of view margin, as captured by the cameras, is not enough to create a stereoscopic view perspective. In this situation, the stereoscopic effect can be proportionally reduced until a monoscopic view perspective is seen by the user. The process can operate in the reverse direction as well, to proportionally increase the stereoscopic view perspective as the user's view perspective rotates in the other direction on the view arc, to a point where at least two video image streams are available to generate the stereoscopic view perspective.

This is accomplished by proportionally adjusting the user's left and right eye view perspective disparity. Disparity is the distance between two parallel vectors extending from the user's left and right eye view perspectives, where the vectors are angled against the respective left and right video image in-line view direction vectors extending out from each video image. (see FIG. 2). Typically, two video image streams are selected as the best fit for the user view orientation. These two video images can be assigned to the left and right eye view perspective using a best fit model. In this disclosure, an arbitrary assignment of the first video image stream can be made as the left eye view perspective and the second video image stream as the right eye view perspective.

Since the camera rig can have cameras at differing angles and orientations to provide image coverage and overlap margin, the captured video image streams can be rotated on their respective center point axis and shifted (tilted) to bring the two selected video image streams into an approximate alignment (thereby allowing for non-divergent stereopsis), to a point where a conventional stitching algorithm can be applied to create a final video image stream.

The selection of the two video images to represent the user view perspective utilizes the retrieved user view direction, rotation, and tilt, collectively the user view orientation. The user needs to use a device capable of detecting the user view orientation. The user view orientation can be in relation to a physical marker and it can be relative to the video image streams as captured by the camera rig. The device capable of detecting the user view orientation can be a separate device or it can be combined with a user display device. The user view orientation detection device can be capable of communicating the user view orientation information to the video processing system, directly or indirectly. A consumption only VR device may not provide the necessary feedback for the process and system to operate.

In other aspects, the first video image stream and second video image stream can be reversed, i.e., reverse the order of the pixels in the left-right direction, and the left and right eye view perspective assignment can be reversed. This can allow a user view perspective that is 180° from the original first and second video image stream in-line view direction. The original video image capture apparatus can have fewer cameras oriented in the zenith and nadir user view directions by using this 180° reversal process to increase the available video image streams that can be utilized with this disclosure.

The video processing can be executed at a server location, at the user's display device location, and other locations. The video image streams can be stored separately or proximate to the user's display device.

Turning now to the figures, FIG. 1 is an illustration of a diagram of an example multi-camera rig (apparatus) 100 capable of capturing zenith and nadir view perspectives with more than one camera. This example apparatus 100 includes 4 cameras positioned to capture the overall zenith view of a scene, cameras 105, 110, 112, and 114. As a demonstration, a first camera 105 view perspective and a second camera 110 view perspective are selected by the process as best representing the user view orientation, i.e., for example, the user is looking up and to the left relative to the forward view perspective vector 121.

Vector 122 represents the user view direction that will generate a stereoscopic video image stream with a maximum state of stereopsis. This vector is at the mid-point between the first camera 105 and second camera 110's in-line view direction, shown as vectors 124 and 125, respectively (see FIG. 2 regarding in-line view direction). When the user view orientation approximately (substantially) aligns with vector 122, then a stereoscopic video image stream can be generated. When the user view orientation approximately aligns with either vector 124 or 125, then the process will generate a monoscopic video image stream.

On the view perspective arc 130 between vectors 122 and 124, and 122 and 125, the process can generate a blended view perspective proportional to the distance from the vector 122. Alternatively, the proportion can utilize the distance to either the vector 124 or 125. Vector 127 is a representative of a view perspective in the blended view perspective portion of the view arc. The blending can be a blending of a monoscopic view perspective and a stereoscopic view perspective. As vector 127 approaches the vector 124 or vector 125, the blending increases monoscopic view perspective, and reduces the disparity, relative to the stereoscopic view perspective. As vector 127 approaches the vector 122, the blending increases the stereoscopic view perspective, and increases the disparity, relative to the monoscopic view perspective.

In this example, first camera 105 and second camera 110 are rotated and tilted relative to each other. The camera positioning is set to capture video image streams in that view perspective while minimizing the number of cameras required to capture those video image streams and maintaining an adequate margin of scene capture overlap. The process can rotate, tilt, scale, and shift the video image streams, from cameras 105 and 110, along their respective center axis, to bring the video image streams into a close enough alignment so that the stitching process can adequately perform its function on the video image streams (enabling the possibility of non-divergent stereopsis). Either one or both of the video image streams can be adjusted in this manner.

The vectors as shown in this example are for demonstrative purposes. The actual vectors for the camera and the vector for the user view perspective (as determined from the user view orientation), can include vectors anywhere along a spherical view perspective centered on the center of the camera rig.

Figure 2:
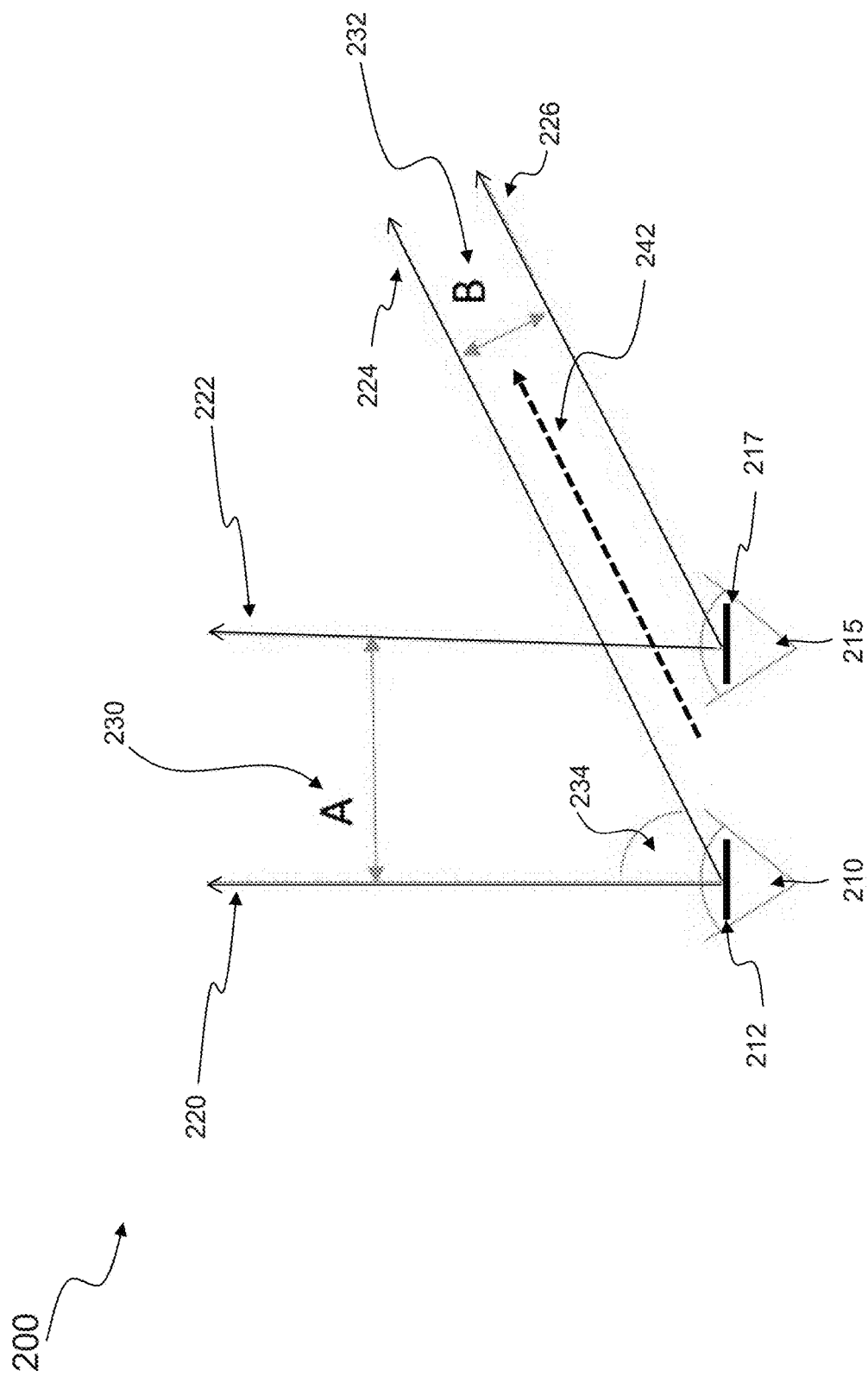
FIG. 2 is an illustration of a diagram of an example video image disparity between a selected first and second video image perspective.

FIG. 2 is an illustration of a diagram 200 that provides an example of the difference between a user view direction and an in-line, i.e., perpendicular, view direction, and demonstrates a user perceived disparity difference between a left and right video image stream pair. A first camera perspective can be assigned as the left video image stream 210, e.g., the left eye perspective. A second camera perspective can be assigned as the right video image stream 215, e.g., the right eye perspective. Extending as the in-line viewing direction from left video image stream 210 is a left eye vector 220 that is a perpendicular vector from the left video image stream's 210 video image plane 212. Similarly, a right eye vector 222 is a perpendicular vector, i.e., the in-line viewing direction for right video image stream 215, relative to the right video image plane 217.

The distance between the centers of the left video image stream 210 and the right video image stream 215 is labeled as disparity A 230. Disparity A 230 is the distance between the left eye vector 220 and the right eye vector 222. If the left eye vector 220 and the right eye vector 222 are not parallel vectors, then the system can rotate and tilt either one or both of the left video image stream 210 and the right video image stream 215 to bring the left eye vector 220 and the right eye vector 222 into approximate parallel alignment.

A user can turn their eyes and/or head slightly to look at the stitched video image stream at some angle from the in-line view direction. If a user changes the view direction a significant amount, then the system can select a different set of first and second video image streams to meet the user's needs. For this disclosure, the system is continuing to use the original first and second video image streams. A user device can detect a new user view direction 242, represented by the dashed line in FIG. 2, to which the user has changed the user view, relative to the first video image stream's 210 and second video image stream's 215 perspectives. In this example, the user view direction 242 is to the right of the vectors 220 and 222. This disclosure applies equally to a user view direction to the left of vectors 220 and 222 with the appropriate changes to the right/left labels in the remaining descriptions below. This change in viewing direction can be represented by a user view angle 234. The user view direction 242 creates a set of approximately (substantially) parallel user view vectors 224 and 226, originating from the same center point of planes 212 and 217 as the respective left eye vector 220 and right eye vector 222 originated. The direction of the view vectors 224 and 226 match the user view direction 242. The disparity distance between view vectors 224 and 226 is labeled as disparity B 232.

In this example, disparity A 230 is larger than disparity B 232. When stitching together the left video image stream 210 and right video image stream 215, the reduction in disparity between A 230 and B 232 can creates a distortion in the stitched generated stereoscopic video image stream. For example, elements within the video image can appear closer to the user than originally captured by the first and second camera perspectives.

Figure 3:
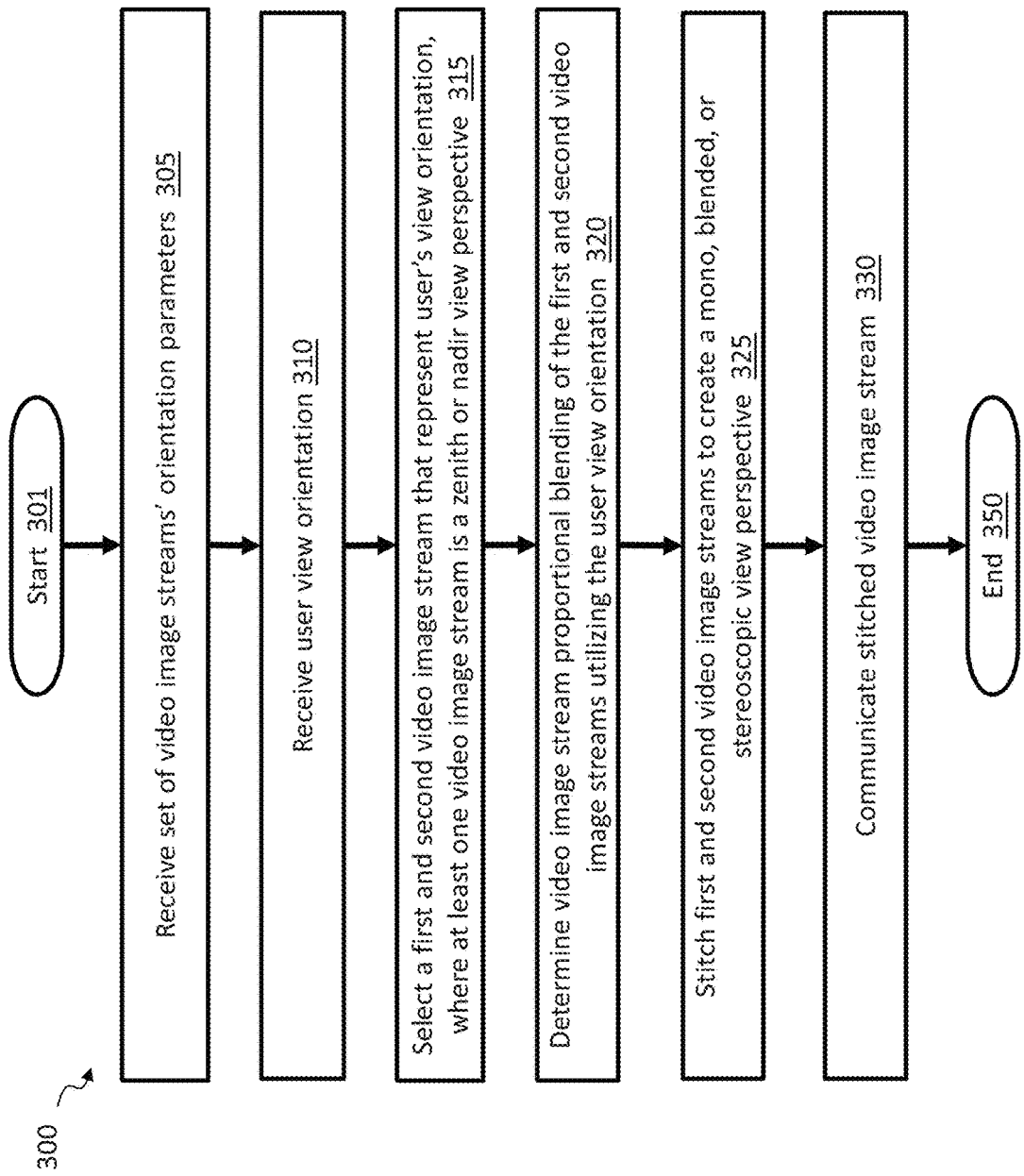
FIG. 3 is an illustration of a flow diagram of an example method to create generated stereoscopic zenith and nadir video image stream.

FIG. 3 is an illustration of a flow diagram of an example method 300 to create a generated stereoscopic video image stream including a zenith or nadir view perspective. The method 300 starts at a step 301. Proceeding to a step 305, the process receives a set of video image streams' orientation parameters. In a step 310, the process receives a user view orientation. In addition, the process can transform the received user view orientation into a relative user view orientation. For example, if the camera rig is tilted 25° to the right and the user's head is tilted 10° to the right, the detected (received) user view orientation of a 10° tilt can be transformed to a relative user view orientation of a 15° tilt to the left.

In a step 315, the process can select a first and second video image stream from the set of available video image streams. The selection is utilizes a best fit model utilizing the relative user view orientation, i.e., the two video image streams selected are those that are closest to the point where the user is viewing. At least one of the first and second video image streams represents the zenith or nadir view perspective as oriented relative to the received set of video image streams, i.e., captured by a zenith or nadir camera on the camera rig. In a step 320, the process can determine the proportional blending of the first and second video image streams, utilizing the relative user view orientation. The blending can vary from a monoscopic view perspective to a stereoscopic view perspective with varying levels of blending between these two points.

Proceeding to a step 325, the first and second video image streams are stitched together using a conventional stitcher algorithm. The output can be a monoscopic, stereoscopic, or blended view perspective. In a step 330, the stitched video image stream can be communicated to a storage location, a network, and a user display device. The method 300 ends at a step 350.

Figure 4:
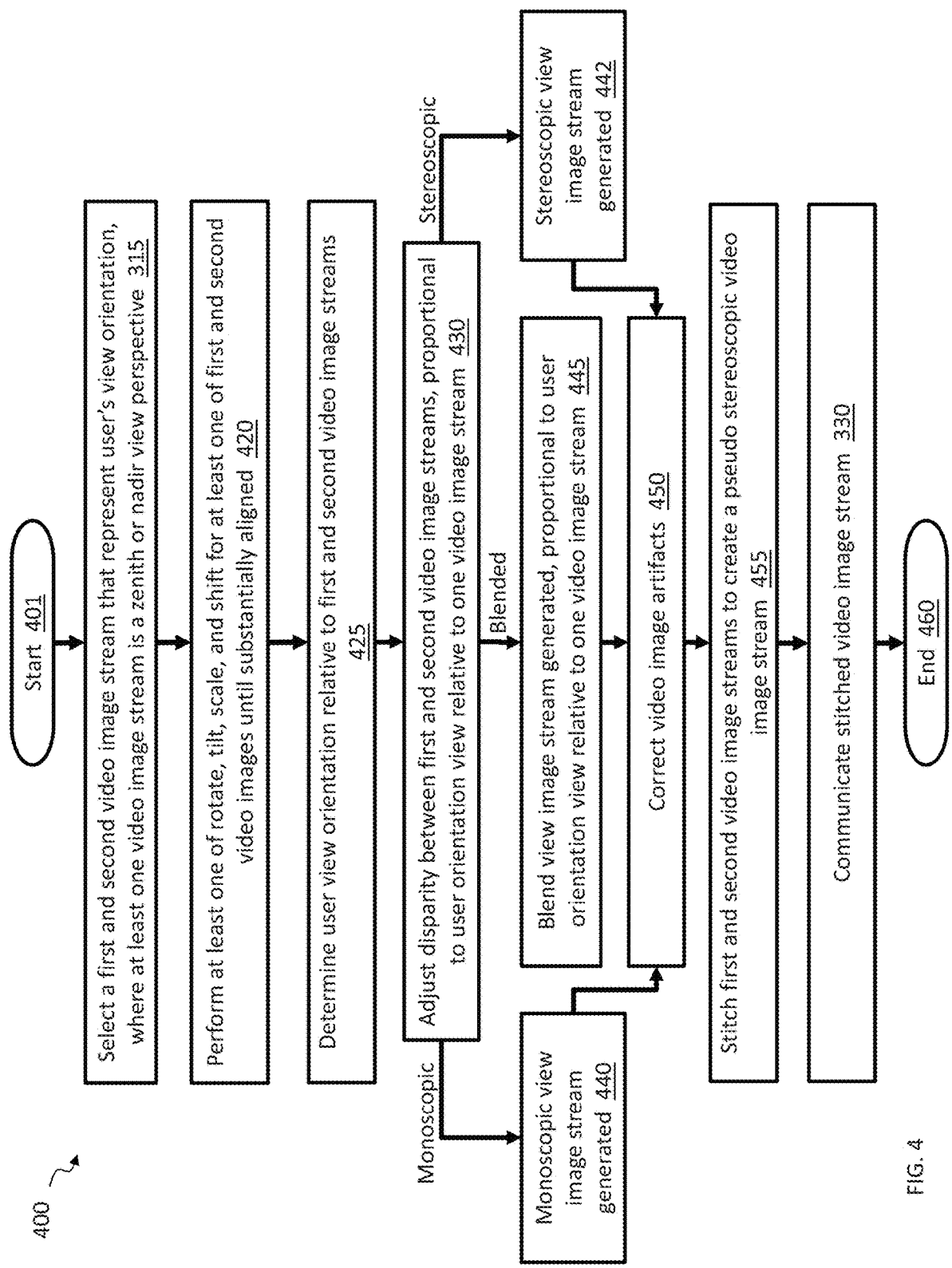
FIG. 4 is an illustration of a flow diagram of an example method, building on FIG. 3, to generate a mono, blended, or stereoscopic video image stream.

FIG. 4 is an illustration of a flow diagram of an example method 400, building on method 300, to generate a mono, blended, or stereoscopic video image stream. Method 400 starts at a step 401 and proceeds through the steps outlined in method 300 through to step 315. Proceeding from step 315 to a step 420, the process can perform a correction and adjustment to one or both of the video image streams identified in the step 315. For example, the process can rotate, tilt, scale, and shift a video image stream to bring the first and second video image streams into an approximate (substantial) alignment that the remaining processes can utilize the streams, such as the stitcher combining the two video image streams.

Proceeding to a step 425, the process can determine the user view orientation relative to the first and second video image streams' in-line view direction. Utilizing the relative user view orientation (which can be different than the received user view orientation in cases, for example, where the user's head or the camera rig are not upright and positioned normally relative to the ground surface), the method 401 proceeds to a step 430.

Step 430 can adjust the disparity between the first and second video image streams. As a user view orientation approaches one of the video streams in-line view orientation (as captured by a camera rig), the disparity between the first and second video image streams is reduced. This proportional reduction in disparity, as compared to the in-line views of one of the video image streams, continues until the disparity approaches zero, at which point the process will morph the generated stereoscopic image into a monoscopic image. The same process applies in the reverse as well. As a user view orientation moves towards the mid-point between the first and second video image stream's in-line view perspective, the disparity between the first and second video image streams is increased. As the disparity increases above zero, the monoscopic view perspective is morphed into a blended view perspective. As the user view orientation approaches that mid-point, the blending approaches a full stereoscopic view perspective state.

In some aspects, approximately the center third, between two video image stream perspectives, of a user view orientation, is generally viewable as a stereoscopic video image. The side thirds of the user view orientation, transitions toward no disparity, i.e., a monoscopic view perspective, as the user view orientation approaches alignment with one of the video image streams, for example, such as when the user view perspective approaches vector 124 in FIG. 1. For example, the view generation process can morph the generated view perspective into a monoscopic view perspective as the relative user view orientation approaches 35% of the total distance between the first and second video image stream's in-line view direction. If, in an example situation, the distance between the first and second video image's in-line view direction is 100 units (any measurement unit can be used for this example), then if the user view orientation creates a user view direction that falls within the range 0-35 units then the first video image stream can be used as a monoscopic view. If the range is 65-100 units then the second video image stream can be used as a monoscopic view. In the range 35-65, the first and second video image streams can be proportionally blended to generate the stereoscopic view perspective. The transition points, 35 and 65, can be selected to fall in either process. The ranges identified herein are for example only. Other ranges can be specified.

From step 430, the process can proceed, utilizing the relative user view orientation, to one of three different steps. The process can proceed to a step 440 where a monoscopic video image stream is generated utilizing the video image stream whose in-line view perspective substantially is in alignment with the user view orientation. The process can proceed to a step 442 where a stereoscopic video image stream is generated utilizing the first and second video image streams. The stereoscopic view perspective is at its fullest state. The process can proceed to a step 445 where a blended video image can be generated utilizing a proportion of the first and second video image streams, and the disparity distance can be proportionally adjusted, where the proportion utilizes the relative user view orientation.

Proceeding from steps 440, 442, and 445, the process proceeds to a step 450 to correct video image stream artifacts that may have been introduced during the adjustment, correction, and blending steps. Such artifacts can include, without limitation, gapping, clipping, distance perspective, and other types of artifacts. Proceeding to a step 455, the process can stitch the corrected and adjusted first and second video image streams into a final video image stream. If step 440 was followed, then the stitching can include just the one video image stream that was selected. In the other cases, a level of blending can be used to the point where if step 442 was followed, the blending generates the maximum stereoscopic view perspective effect.

Proceeding to the step 330, the stitched video image stream is communicated as described further in step 330 above. The method ends at a step 460.

Figure 5:
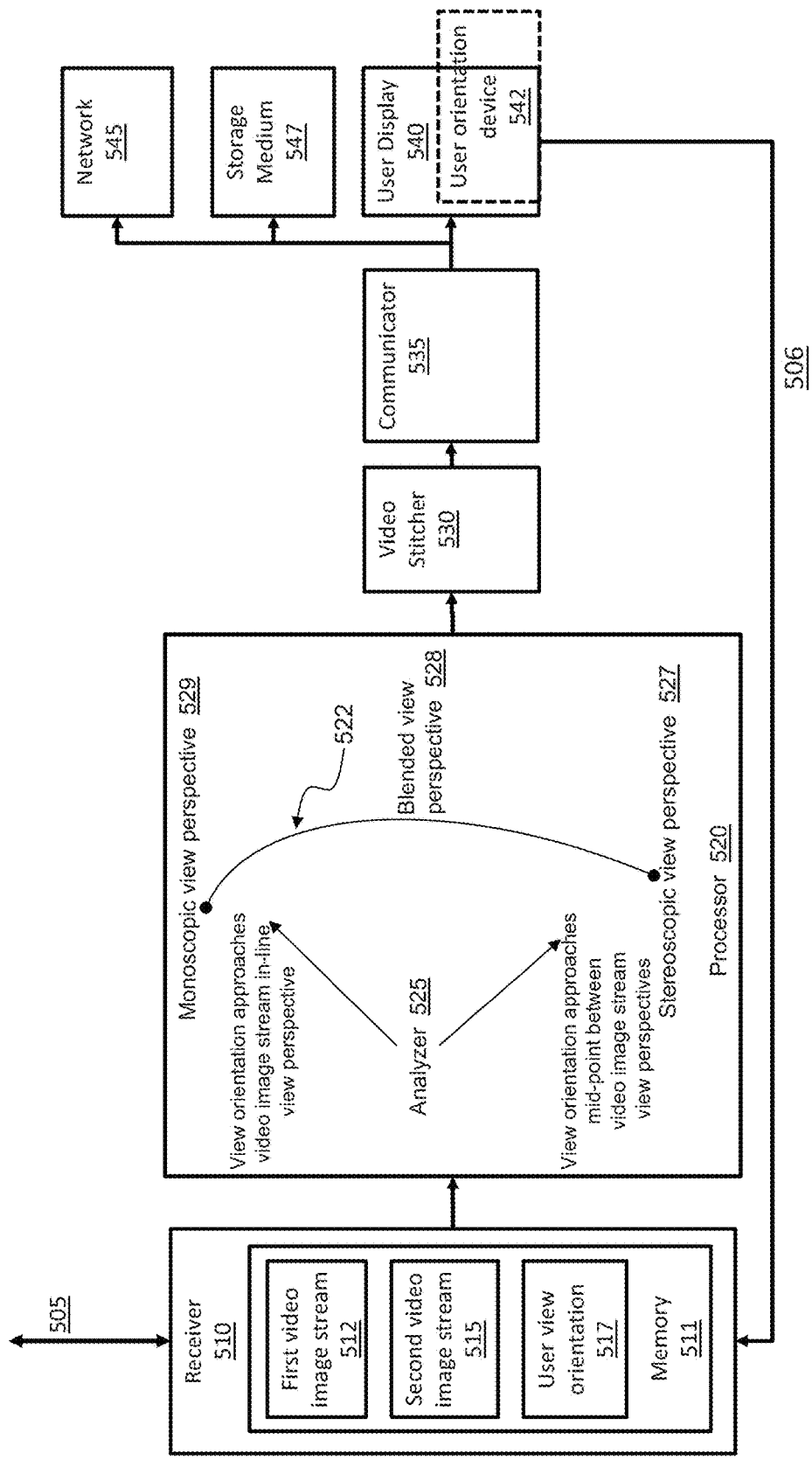
FIG. 5 is an illustration of a block diagram of an example system to create generated stereoscopic video images for zenith and nadir user view orientations.

FIG. 5 is an illustration of a block diagram of an example system 500 to create generated stereoscopic video images for relative zenith and nadir user view directions. System 500 comprises a receiver 510, a processor 520, an analyzer 525, a video stitcher 530, a communicator 535, at least one of output devices user display 540, network 545, and storage medium 547, and a user orientation device 542. The orientation parameters for video image streams 505 can be received by the system by receiver 510 and stored in memory 511. In some aspects, the memory 511 can be a buffer. The video image streams 505 can be from a source, such as a storage medium (memory, hard disk, cloud storage, database, disk, CD, DVD, tape, film, and other types of storage mediums capable of storing more than one video image stream, and the corresponding orientation parameters, captured by a camera rig system), or directly from a camera rig system. The set of video image streams 505 comprises at least 2 video image streams, captured from two proximate camera view perspectives, and captured at substantially the same time. In addition, at least one of the video image streams is a zenith or nadir view perspective.

Receiver 510 also receives detected user view orientation 506 as identified by the user orientation device 542 and stored in memory 511. Captured user view orientation 506 is transformed into a relative user view orientation 517, relative to the received orientation parameters for the video image streams. This allows for adjustments such as a user whose view perspective is not upright and aligned in a forward direction, e.g., the user's head is upside down, or if the camera rig is tilted or angled in some fashion. Receiver 510 can identify a first 512 and second 515 video image stream from the received orientation parameters and the user view orientation 517. Receiver 510 can then request and pull those selected video image streams from the data source. Alternatively, receiver 510 can receive the set of video image streams 505, along with the orientation parameters, and then identify and use those streams that are appropriate for the user view orientation. The two selected video images are selected utilizing the best fit with the user view direction, tilt, and rotation, i.e., the relative user view orientation. If a user changes the view orientation to a significantly large degree, a different set of two video images can be selected to better represent the relative user view orientation.

Receiver 510 can pass the resulting video image streams and user view orientation to processor 520. In some aspects, receiver 510 can assign the first video image stream 512 as the user's left eye view perspective and the second video image stream 515 as the user's right eye view perspective. In other aspects, receiver 510 can receive input 505 and 506, and then pass the received information to processor 520 which can then transform the user view orientation to the relative user view orientation and identify the first and second video image streams. Alternatively, a third process can be utilized for these tasks where it receives input from receiver 510 and then the output from the third process is passed to the processor 520.

Processor 520 can adjust, utilizing analyzer 525, the first 512 and second 515 video image streams, utilizing the user view orientation 517 to create a stereoscopic video image stream 527, a blended video image stream 528, or a monoscopic video image stream 529. The type of video image stream created is dependent on the user view orientation 517 relative to the in-line view direction of each of the first 512 and second 515 video image streams. The in-line view direction for each video image stream is shown in diagram 200 (see FIG. 2, elements vector 220 and vector 222).

As the relative user view orientation moves toward one of the first 512 or second 515 video image in-line directions, along the user view arc 522, the stereoscopic view effect is proportionally blended with a monoscopic view effect, see element 528. The proportionality utilizes the relative distance from the mid-point between the two in-line view directions, see element 527, and the closest in-line view direction, see element 529. When the relative user view orientation is substantially aligned with either in-line view direction, then a monoscopic view perspective is generated. When a user view direction is substantially aligned at the mid-point between the two in-line view directions, then a stereoscopic view perspective is generated. In between these positions, a proportional blended view perspective is generated.

Processor 520 can also rotate, tilt, shift, and scale one or both video image streams 512 and 515 about their respective central axis' to substantially align the first 512 and second 515 video image streams. This alignment can allow the stitcher 530 to properly combine the two video image streams into a final video image stream.

Stitcher 530, after combining the video image streams, can transmit, through communicator 535, to a device, such as user display 540, network 545, and storage medium 546. User display 540 can include a user orientation device 542 (shown as a dashed box) to detect and transmit a user view orientation. Alternatively, the user orientation device 542 can be separate from the user display 540.

System 500 is a functional view of the video processing system 500 utilizing zenith and nadir views. The physical implementation of the described functions can be combined or separated, for example, processor 520 can include stitcher 530, a graphics processing unit can be utilized to process the video image streams, and analyzer 525 can be part of or separate from processor 520. In an alternative aspect, the functions described can be included in a user device, such that the user device can communicate with the video image stream storage medium and other processing occurs locally to the user device.

Figure 6:
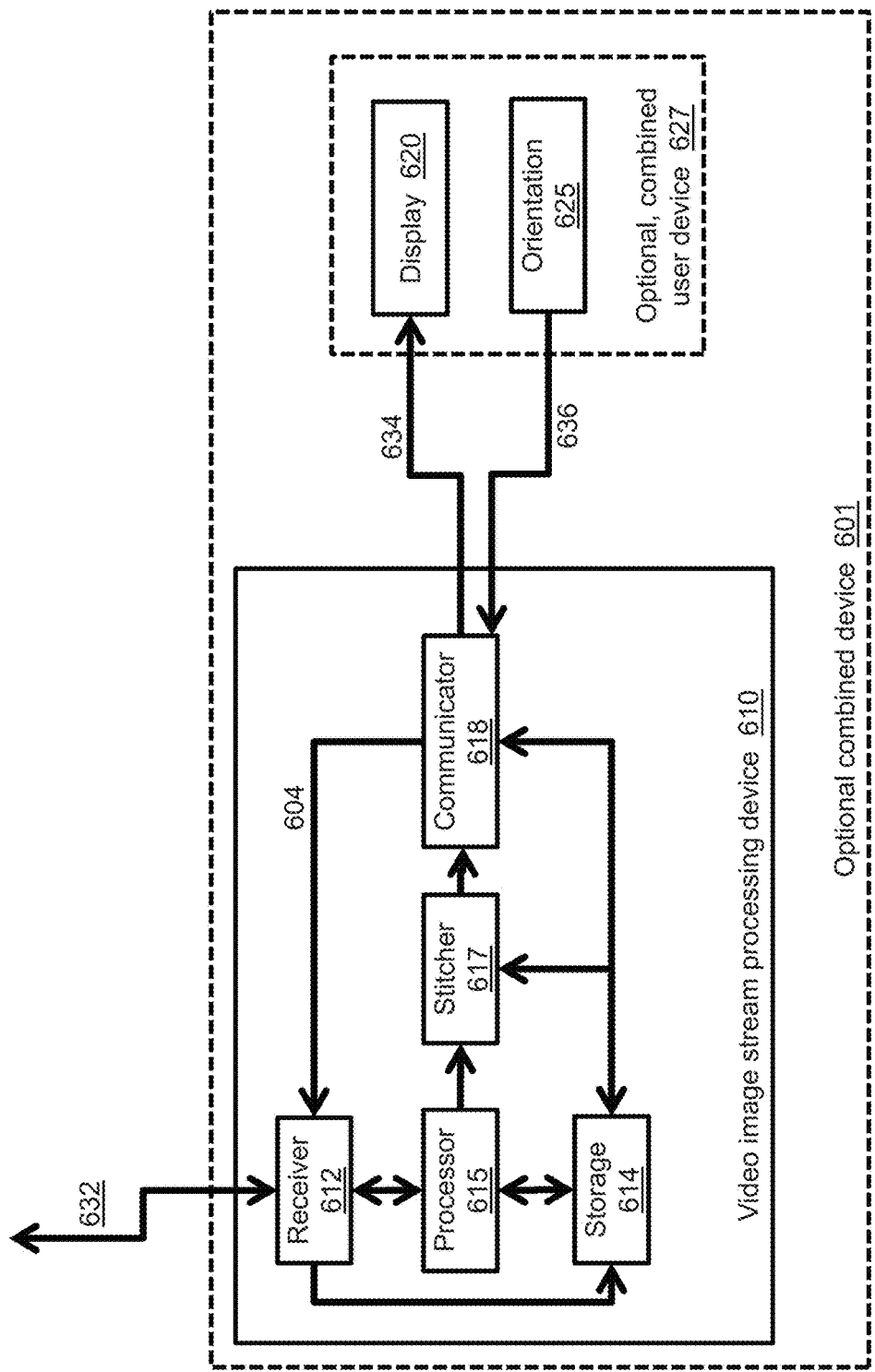
FIG. 6 is an illustration of a block diagram of an example apparatus capable of generating a mono, blended, and stereoscopic view perspective for zenith and nadir user view orientations.

FIG. 6 is an illustration of a block diagram of an example apparatus 600 capable of generating a mono, blended, and stereoscopic view perspective for zenith and nadir user view orientations. Apparatus diagram 600 comprises a video image stream processing device 610, user display device 620, and a user view orientation detector device 625. Optionally, user display device 620 and user view orientation detector device 625 can be combined as user device 627. Additionally, video image stream processing device 610, user display device 620, and user view orientation detector device 625 can be optionally combined as combined device 601. Other combinations are acceptable for this disclosure as well, for example, devices 610, 620, and 625 can be proximate or separate from each other, such as if processing device 610 is located in a cloud services system separate from a local user display device. In another aspect, the video image storage medium, as captured by a camera rig, can be stored local to the user display device.

Video image stream processing device 610 comprises receiver 612, a local storage 614, a processor 615, a stitcher 617, and a communicator 618. Receiver 612 can be communicatively coupled, via communication 632, to a storage medium that can store video image streams captured from a camera rig and it can be coupled to a camera rig itself. The storage medium can be located proximate the apparatus 600, separate from apparatus 600, be located in a cloud system, server system, data center, and other locations. Receiver 612 is also coupled to local storage 614, processor 615, and communicator 618.

Processor 615 is communicatively coupled to local storage 614 and stitcher 617. Stitcher 617 is communicatively coupled to local storage 614 and communicator 618. Communicator 618 can receive user view orientation parameters via input 636 from user view orientation detector device 625, and can communicate the parameters to receiver 612, via communication 604. Communicator 618 can also communicate the stitched video image stream to, in this example, user display device 620. In other aspects, different devices can receive the output 634.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

As will be appreciated by one of skill in the art, the disclosure or parts thereof may be embodied as a method, apparatus, system, or computer program product. Accordingly, the features disclosed herein, or at least some of the features, may take the form of an entirely hardware embodiment, an entirely software embodiment (including firmware, resident software, micro-code, etc.) or an embodiment combining software and hardware aspects all generally referred to herein as a "circuit" or "module." Some of the disclosed features may be embodied in or performed by various processors, such as digital data processors or computers, wherein the computers are programmed or store executable programs of sequences of software instructions to perform one or more of the steps of the methods. Thus, features or at least some of the features disclosed herein may take the form of a computer program product on a non-transitory computer-usable storage medium having computer-usable program code embodied in the medium. The software instructions of such programs can represent algorithms and be encoded in machine-executable form on non-transitory digital data storage media.

Thus, portions of disclosed examples may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

What is claimed is:

1. A method of generating a stereoscopic video image stream of scene images captured by multiple cameras, comprising:
   selecting video image streams from said scene images that proximately represent a user view orientation that is relative to said multiple cameras, wherein at least one of said video image streams is a zenith or nadir user view perspective of said scene images; and
   generating a stereoscopic video image stream for said zenith or nadir user view perspective utilizing said video image streams and a blending of a monoscopic view perspective and a stereoscopic view perspective, wherein said blending is proportionate to said user view orientation and orientations of said video image streams.

2. The method as recited in claim 1 wherein said video image streams are captured at substantially a same time.

3. The method as recited in claim 1, wherein said user view orientation corresponds to an up, down, left, or right direction.

4. The method as recited in claim 1, wherein said video image streams include a first video image stream and a second video image stream.

5. The method as recited in claim 4, further comprising generating a stereoscopic video image stream 180° relative to a user view perspective from said first video image stream and said second video image stream by reversing pixels of said first video image stream and of said second video image stream, and by reversing assignments of said first video image stream and said second video image stream to a left and right eye perspective.

6. The method as recited in claim 1, wherein said generating includes morphing said video image streams based on a distance between a view direction of said video image streams to an in-line view direction of one of said video image streams.

7. The method as recited in claim 1, wherein said generating includes increasing disparity between said video image streams utilizing said user view orientation.

8. The method as recited in claim 1, wherein said generating includes increasing a stereoscopic view perspective of said video image streams based on said user view and a distance between said view directions of said video image streams.

9. The method as recited in claim 1, wherein said generating includes aligning said video image streams by adjusting at least one of said video image streams by rotating, tilting, scaling, or shifting.

10. A video processing system operable to generate user view perspectives of scene images captured by multiple cameras, comprising:

a stitcher, operable to combine multiple video image streams of said scene images to generate a stereoscopic video image stream; and a processor, operable to adjust at least one of said multiple video image streams by utilizing a relative user view orientation and by blending monoscopic and stereoscopic user view perspectives, wherein at least one of said video image streams is a zenith or nadir view direction of said scene images.

11. The video processing system as recited in claim 10, wherein said stereoscopic video image stream is a monoscopic view according to an alignment between said relative user view orientation and an in-line view direction of one of said video image streams.

12. The video processing system as recited in claim 10, wherein said stereoscopic video image stream is a stereoscopic view according to an alignment between said relative user view orientation and a mid-point between in-line view directions of said video image streams.

13. The video processing system as recited in claim 10, wherein said stereoscopic video image stream is a blended view based on a relationship between said relative user view orientation, an in-line view direction of one of said video image streams, and a mid-point between in-line view directions of said video image streams.

14. The video processing system as recited in claim 10, wherein said processor is operable to generate a stereoscopic video image stream user view perspective that is 180° relative to a user view perspective generated from said video image streams by reversing order of pixels of said video image streams, and changing assignments of said video image streams as to a left eye and right eye view perspective.

15. The video processing system as recited in claim 10, wherein said stitcher is operable to generate said stereoscopic video image stream by morphing said video image streams based on a distance between a view direction of said video image streams to an in-line view direction of one of said video image streams.

16. The video processing system as recited in claim 10, wherein said stitcher is operable to generate said stereoscopic video image stream by increasing disparity between said video image streams utilizing said relative user view orientation.

17. The video processing system as recited in claim 10, wherein said stitcher is operable to generate said stereoscopic video image stream by adjusting at least one of said video image streams by rotating, tilting, scaling, or shifting.

18. A video processing computer that generates user view perspectives of scene images captured by a multi-camera apparatus, comprising:

a processor operable to generate adjusted video image streams based on a user view orientation and video image streams, wherein at least one of said video image streams is a zenith or nadir view perspective of said scene images; and a stitcher operable to generate a stereoscopic video image stream utilizing said adjusted video image streams.

19. The video processing computer recited in claim 18, wherein generating said adjusted video image streams further includes blending monoscopic and stereoscopic user view perspectives.

20. The video processing computer recited in claim 19, wherein said blending is proportionate to said user view orientation and orientations of said video image streams.

* * * * *